United States Patent [19]
Geromini et al.

[11] Patent Number: 5,997,934
[45] Date of Patent: Dec. 7, 1999

[54] MANUFACTURE OF COOKED CEREALS

[75] Inventors: Osvaldo Geromini, Valeyres/Rances; Ernst Heck, Vufflens la Ville, both of Switzerland; Jean Noel Huet, Oye-Et-Pallet; Thierry Martin, Amiens, both of France; Werner Pfaller, Orbe, Switzerland

[73] Assignee: Nestec S.A., Vevey, Switzerland

[21] Appl. No.: 08/855,912

[22] Filed: May 14, 1997

Related U.S. Application Data

[63] Continuation-in-part of application No. 08/546,324, Oct. 20, 1995, abandoned, which is a continuation-in-part of application No. 08/430,551, Apr. 28, 1995, abandoned.

[51] Int. Cl.$^6$ .......................... A21D 10/00; A23L 1/168; A23B 4/03
[52] U.S. Cl. .......................... 426/549; 426/618; 426/448; 426/449; 425/207
[58] Field of Search .................... 426/549, 618, 426/448, 449; 425/207

[56] References Cited

U.S. PATENT DOCUMENTS

| | | | |
|---|---|---|---|
| 3,137,592 | 6/1964 | Protzman et al. | 127/32 |
| 4,230,503 | 10/1980 | Hughes | 127/1 |
| 4,431,598 | 2/1984 | Korpman | 264/176 |
| 4,438,146 | 3/1984 | Colby et al. | 426/448 |
| 4,568,550 | 2/1986 | Fulger et al. | 426/19 |
| 4,721,589 | 1/1988 | Harris | 264/40.1 |
| 4,759,942 | 7/1988 | Von Fulger | 426/621 |
| 4,778,699 | 10/1988 | Sadel et al. | 426/560 |
| 4,837,112 | 6/1989 | Calandro et al. | 426/463 |
| 5,024,996 | 6/1991 | Ringe | 514/54 |
| 5,156,781 | 10/1992 | Bohm et al. | 264/40.1 |

FOREIGN PATENT DOCUMENTS

| | | |
|---|---|---|
| 524329 | 1/1993 | European Pat. Off. . |
| 545056 | 6/1993 | European Pat. Off. . |
| 682875 | 11/1995 | European Pat. Off. . |
| 9005452 | 5/1990 | WIPO . |

*Primary Examiner*—Frank C. Eisenschenk
*Assistant Examiner*—Mary K. Zeman
*Attorney, Agent, or Firm*—Pennie & Edmonds LLP

[57] ABSTRACT

A process for the manufacture of cooked cereals or dry pet food which comprises preparing a mixture of water and a dry premix mainly comprising cereal flour or semolina, cooking the mixture and extruding it by pressing it through an extrusion die with the aid of a gear pump.

7 Claims, 1 Drawing Sheet

MANUFACTURE OF COOKED CEREALS

This application is a continuation-in-part of application Ser. No. 08/546,324 filed Oct. 20, 1995, now abandoned which is a continuation-in-part of copending application Ser. No. 08/430,551 filed Apr. 28, 1995, now abandoned.

FIELD OF THE INVENTION

The subject of the present invention is a process for the manufacture of cooked cereals or dry pet food which comprises preparing a mixture of water and a dry premix of cereal flour or semolina, cooking the mixture and extruding it, as well as an apparatus for carrying out the process.

BACKGROUND OF THE INVENTION

Different processes are known which comprise at least one step of extrusion cooking a mixture of water and a dry premix mainly comprising cereal flour or semolina.

AU-A-4591389 (GERBER PRODUCTS COMPANY) discloses a process for producing instant cereals which comprises moistening a dry blend mainly comprising a cereal flour and including additional oil and vitamins, extrusion cooking the moistened blend into an expanded rope, slicing the rope into puffs, grinding and screening the puffs to give a fine powder-like particle size, and agglomerating the particles into granules.

EP-A-0524329 (SOCIETE DES PRODUITS NESTLE S.A.) discloses a process for the manufacture of precooked cereal foods by extrusion cooking a moist blend of cereals, wherein a compressed gas is injected into the blend at the end of the cooking stage, just before the extrusion stage.

Further, many uses of gear pumps are known, for example supplying well metered amounts of food materials into relatively complicated coextrusion apparatus.

EP-A-0202143 (NABISCO BRANDS INC.) discloses a triple coextruder capable of coaxially coextruding two cooking doughs having different compositions and textures separated by a layer of an oil-based material serving as a moisture barrier, the doughs and the oil-based material being metered into respective nozzle portions of the coextruder by gear pumps, for example.

EP-A-0280484 (KOBAYASHI, MASAO) discloses a coextrusion apparatus capable of forming a globular food product by wrapping a center material with one or more layers of other food materials, in which the different materials are also metered into respective nozzle portions of the coextrusion apparatus by gear pumps, for example.

SUMMARY OF THE INVENTION

The aim of the present invention is to provide a process for the manufacture of cooked cereals or dry pet food and an apparatus for carrying out the process which consumes relatively little energy and which subjects the said mixture to relatively little shear forces.

To this end, the process for the manufacture of cooked cereals or dry pet food according to the present invention, which comprises preparing a mixture of water and a dry premix mainly comprising cereal flour or semolina, cooking the mixture and extruding it, distinguishes itself by the fact that the cooked mixture is extruded by pressing it through an extrusion die with the aid of a gear pump.

Likewise, the apparatus for carrying out the process according to the present invention comprises a mixing and/or cooking device, a gear pump and an extrusion die.

The cereal flour or semolina should be cooked sufficiently to form a totally gelatinized mixture before being extruded. The term "totally gelatinized" means a degree of gelatinization of at least about 95%, as measured enzymatically, with the remaining amount of starch, i.e., 5% or less, not being accessible to the enzyme.

Throughout the present specification and claims, the expression "mainly comprising cereal flour or semolina" means comprising at least about 50% or preferably at least about 80% of cereal flour or semolina.

Similarly, the expression "a mixture of water and a dry premix" means "either a mixture of water and dry premix or a mixture of steam, water and dry premix".

It has been observed, surprisingly, that it is possible to manufacture cooked cereals or dry pet food which have remarkable organoleptical properties, especially as to their texture and flavor, while consuming relatively little energy and subjecting the mixture of water and cereal material to relatively little shear forces, in spite of the fact that this mixture passes through a gear pump and that it is briefly subjected therein to a severe compression.

Indeed, between the teeth of a gear pump comprising two toothed wheels or rollers which mesh with each other, the mixture may be subjected to a compression of several hundreds of bar during a fraction of a second, for example.

To carry out the present process for manufacturing cooked cereals, it is possible to prepare a dry premix comprising about 80–88% of a flour or semolina of a cereal such as wheat, oat, corn or rice, about 2–12% of sugars such as sucrose and dextrose, and other traditional ingredients such as about 1-2% of sodium chloride, up to 15% of modified starches such as modified corn or wheat starches, up to 10% of powdered milk or other protein source, up to about 0.5% of mineral salts, up to about 0.5% of vitamins, up to 2% antioxidants and possibly even enzymes which can reduce the viscosity of the mixture to be prepared, for example.

For manufacturing dry pet food, it is possible to prepare a dry premix comprising at least about 50% of cereal flour or semolina, about 25–35% of meat flour and animal by-products, about 5–15% fat and tallow, up to 10% vegetable by-products and up to 6% vitamins and minerals, for example.

For manufacturing either cooked cereals or dry pet food it is possible to prepare a mixture of water and the premix such that the mixture has a water content of about 10–40% by weight, with the aid of a high speed blade mixer, a twin-screw intermeshing and corotating mixer or extruder, or a single-screw extruder, for example.

It is possible to cook this mixture by heating it to about 80–200° C. for about 20 seconds to about 180 minutes, with the aid of a mixing and cooking device such as a twin-screw intermeshing and corotating mixer or extruder, or a single-screw extruder, and/or a cooking device such as a double jacketed cylindrical vessel enclosing internal transporting means such as an Archimedes screw, for example.

Preferably, the various possible screw configurations of the above devices which may be used for carrying out the present mixing and cooking steps are chosen in order to subject the mixture to relatively low shear forces. Such screws generally comprise a shaft upon which bilobes each having the shape of a screw section are fitted and attached onto each other. The length and the direction of the screw pitch associated with a bilobe can be chosen in function of the type of work which it is desired to perform in numerous successive and/or alternating zones of the screw, a relatively long pitch rather corresponding to a mixing zone and a relatively short pitch rather corresponding to a cooking zone, for example.

It is possible to maintain a pressure of less than about 2000 kPa, preferably of from about 100 to about 1000 kPa upstream of the gear pump and to have the gear pump exerting a pressure of from about 2000 to about 20000 kPa on the mixture upstream of the die, for example.

In order to press the mixture through the extrusion die, it is possible to exert the pressure on the mixture during the cooking step, especially by connecting the gear pump between a mixing and cooking device and a cooking device, for example. In such an embodiment, the present process permits the use of a mixture having a relatively high dry matter content, that means a relatively high viscosity, while using a cooking device which itself would not be capable of transporting such a mixture.

It is possible to further enhance the dry matter content by using enzymes which lower the vicosity of the mixture.

A relatively high dry matter content, especially of from about 78% to about 90%, may be necessary if one wishes to obtain an expanded product at the exit of the die, for example.

It is also possible to exert the pressure on the mixture after the cooking step, by connecting the gear pump between a mixing and cooking device and the die, for example.

The gear pump may comprise two toothed wheels, or toothed rollers which mesh with each other. The two rollers can rotate in a housing on axles situated in a plane perpendicular to the direction of a mixture stream. They can each rotate in the opposite direction, the teeth coming apart upstream and closing again downstream. The outer edge of the teeth can slide against a corresponding inner wall of the housing, thus defining intersticial spaces intended for transporting the mixture to be extruded downstream. The shape of the teeth may be especially designed to avoid as much as possible any friction between the teeth which mesh with each other and any shearing on the mixture transported.

The gear pump is preferably provided with a double jacketed body.

It is possible to cut the extruded rope of cooked mixture into pellets or puffs just at the exit of the die, with the aid of a cutting device such as a rotating knife, for example.

The extrusion die may comprise one or more extrusion conduits, especially cylindrical conduits, generally oriented in the same direction as that of a stream of mixture to be extruded, preferably in a direction perpendicular to the plane in which the roller axles are situated, for example. The shape of the extruded rope may be determined in particular by the shape of the outlet opening or orifice of the conduits.

The die is preferably enclosed in a double jacketed casing in which a cooling or heating fluid can be circulated.

BRIEF DESCRIPTION OF THE DRAWINGS

Embodiments of the invention are described below by way of example only with reference to the accompanying drawings in which.

DETAILED DESCRIPTION OF THE INVENTION

Figure 1:
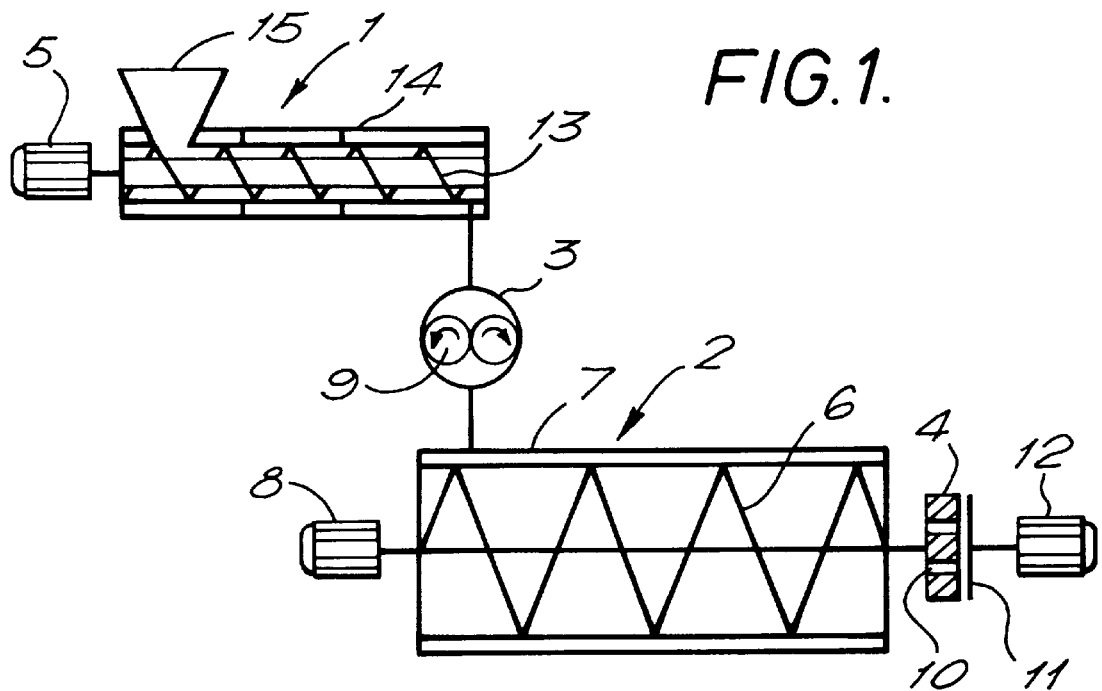
FIG. 1 is a schematic view of an embodiment where the gear pump is connected between a mixing and cooking device and a cooking device.

In the embodiment represented in FIG. 1, the apparatus comprises a mixing and cooking device 1, a cooking device 2, a gear pump 3 connected between the mixing and cooking device 1 and the cooking device 2, and an extrusion die 4.

The mixing and cooking device 1 is in the form of screws 13 which intermesh and corotate. In other words, the screws 13 rotate in the same direction and mesh with each other. They are driven by a motor 5. They are enclosed in a barrel 14 having at its upstream end an inlet 15 for feeding water and a dry premix. Suitable devices are commercially available and may be obtained from Wenger, Clextral, Teledyne and the like.

The gear pump 3 comprises two toothed rollers 9 which mesh with each other. Suitable devices are commercially available and may be obtained from Maag.

The cooking device 2 comprises a double jacketed cylindrical vessel 7 enclosing an Archimedes screw 6 driven by a motor 8.

The extrusion die 4 comprises a plate pierced with several cylindrical conduits 10. A cutting device is provided at the exit of the die 4 in form of a rotating knife 11 driven by a motor 12. Suitable extrusion dies and cutting devices are well known in the art and may be obtained from Wenger and Clextral, for example.

Figure 2:
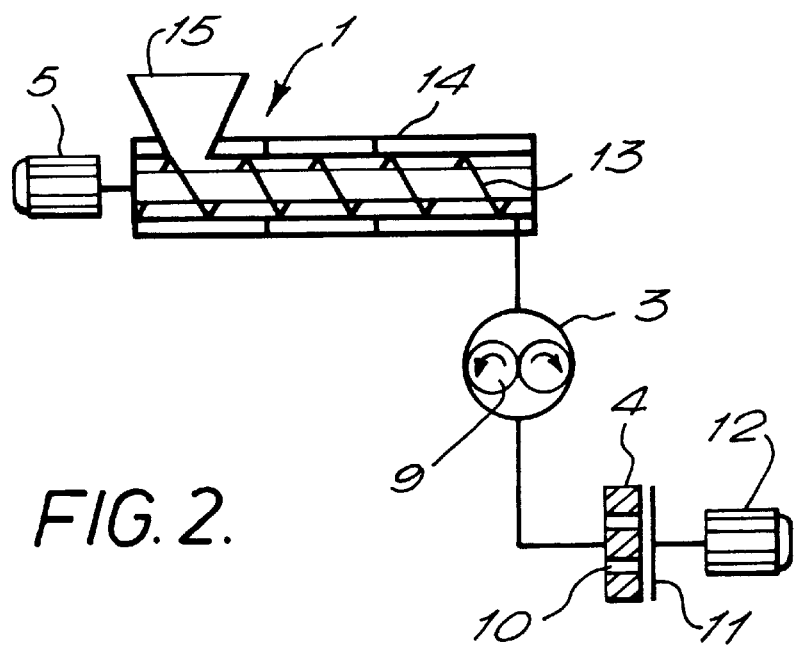
FIG. 2 is a schematic view of an embodiment where the gear pump is connected between a mixing and cooking device and the extrusion die.

In the embodiment represented in FIG. 2, the apparatus comprises a mixing and cooking device 1, an extrusion die 4 and a gear pump 3 connected between the mixing and cooking device 1 and the extrusion die 4.

The mixing and cooking device 1, the gear pump 3 and the extrusion die 4 are similar to the corresponding devices described above with reference to FIG. 1.

Through the use of the gear pump, the screw and casing of the extruder which are near the outlet nozzle experience much less wear during operation. The useful service life of the extruder is thus extended, which provides additional cost savings both in terms of reduced maintenance and less frequent replacement.

The process according to the present invention is described in greater detail in the examples presented below by way of illustration. The percentages are given therein by weight.

EXAMPLE 1

An arrangement corresponding to the embodiment represented in FIG. 1 was used, in which the mixing and cooking device was a twin-screw intermeshing and corotating READCO type TELEDYNE mixer. This mixer had a screw diameter of 127 mm and a total processing length of 7.2 times the screw diameter. It was driven by a motor the speed of which was adjustable between 50 and 510 rpm at a maximum power of 37 kW. Its barrel was temperature controlled either with the aid of steam or hot water heat exchangers.

The gear pump was a VACOREX VX 70/70 type MAAG pump. It was driven by a motor the speed of which was adjustable. It was provided with a double jacketed body which was temperature controlled with the aid of a hot water exchanger.

The cooking device was a cylindrical vessel with double jacket enclosing an Archimedes screw. The temperature of the double jacketed vessel was controlled with the aid of a hot water heat exchanger.

The extrusion die was a plate pierced with two cylindrical conduits each 4 mm in diameter. It was enclosed in a double jacketed casing which was temperature controlled with the aid of a water heat exchanger.

The cutting device was a rotating knife driven by a motor the speed of which was adjustable.

With the aid of this apparatus, cooked cereals were manufactured in the following way:

20 kg/h of water heated to 80° C. and 50 kg/h of a dry premix mainly comprising corn semolina were fed into the mixing and cooking device. The premix had a water content of about 11%. The mixture of water and dry premix thus had a water content of about 36.4%.

The composition of the premix was:

| | |
|---|---|
| corn semolina | 88% |
| sucrose | 8% |
| sodium chloride | 2% |
| vitamins | 0.5% |
| mineral salts | 0.5% |
| antioxydant | 1% |

The screw speed of the mixing and cooking device (n-mixcook) was set to 200 rpm. The temperature of the barrel of the mixing and cooking device was maintained between 127 and 137° C. The residence time of the mixture within the mixing and cooking device (t-mixcook) was about 30 seconds. At the end of the mixing and cooking device the mixture was totally gelatinised and it had a temperature (T-mixcook) of 104° C. The pressure in the mixing and cooking device and at the inlet of the gear pump (p-gear) was 100 kPa.

The speed of the toothed rollers of the gear pump (n-gear) was set to 9 rpm. The temperature of the body of the gear pump was maintained at 100° C. The residence time of the gelatinized mixture within the gear pump was about 8 seconds.

The temperature of the double jacket of the cooking device was maintained at 90° C. The residence time of the mixture within the cooking device was about 3 hours. At the end of the cooking device the cooked mixture had a temperature of 84° C. The pressure at the end of the cooking device and in front of the extrusion die (p-die) was 2000 kPa.

The temperature of the double jacketed casing of the extrusion die was maintained at 90° C.

The cooked cereals thus manufactured were ball-shaped, partly expanded pellets, ready to be processed with further down-stream equipment in order to be either puffed or rolled into flakes, for example.

The smell and the taste of the mixture improved noticeably during its long residence time in the cooking device. Before entering the cooking device, the gelatinized mixture was light yellow and did not really have the smell and taste of well cooked cereal. After leaving the cooking vessel, the color of the cooked mixture had changed to dark yellow-light brown and its smell and taste were more intensive, namely similar to those of fresh baked bread.

It is important to note that the mixture was totally gelatinized, namely totally precooked before entering the cooking device which rather functioned as a holding device without transferring any further heat into the mixture.

Thus, a specific energy input into the mixture (E-mixture) may be defined as the sum of the respective power consumption of the mixing and cooking device (W-mixcook) and of the gear pump (W-gear) divided by the flowrate of the mixture. In the present example, W-mixcook was 9.8 kW, W-gear was 0.8 kW and E-mixture was 0.15 kWh/kg.

EXAMPLES 2 TO 5

An arrangement corresponding to the embodiment represented in FIG. 2 was used.

In Example 2, the mixing and cooking device was a twin-screw intermeshing and corotating READCO type TELEDYNE mixer identical to the one used in Example 1.

In Example 3, the mixing and cooking device was a twin-screw intermeshing and corotating BC-72 H type CLEXTRAL extruder. This extruder had a screw diameter of 88 mm and a total processing length of 17 times the screw diameter. It was driven by a motor the speed of which was adjustable. Its barrel was temperature controlled with the aid of induction heating coils.

In Example 4, the mixing and cooking device was a single-screw X-25 type WENGER extruder. This extruder had a screw diameter of 133 mm and a total processing length of 8.8 times the screw diameter. It was driven by a motor the speed of which was adjustable. Its barrel was temperature controlled with the aid of induction heating coils.

In Example 5, the mixing and cooking device was an OE 15.2 type KHAL expander which is a kind of single screw extruder.

In Example 2 the composition of the premix was the same as in Example 1.

In Example 3 and 4 the composition of the premix was:

| | |
|---|---|
| corn semolina | 25% |
| rice flour | 55% |
| sucrose | 12% |
| modified corn starch | 4% |
| sodium chloride | 2% |
| vitamins | 0.5% |
| mineral salts | 0.5% |
| antioxydant | 1% |

In Example 5 the composition of the premix was:

| | |
|---|---|
| corn semolina | 50% |
| meat flour and animal by-products | 29% |
| fat and tallow | 9% |
| vegetable by-products | 8% |
| vitamins, minerals | 4% |

In all of Examples 2 to 5, the gear pump was a VACOREX VX 70/70 type MAAG pump. It was driven by a motor the speed of which was adjustable. It was connected at the end of the mixing and cooking device and in front of the die. It was provided with a double jacketed body in which a temperature of 120° C. was maintained with the aid of a high pressure water based heat exchange system. The speed of its toothed rollers was adjusted in order to keep a constant pressure of about 100–200 kPa at its inlet.

The gelatinized mixture of Examples 2–5 was totally gelatinized before being pressed through a die plate pierced with one or more cylindrical extrusion conduits, each a few mm in diameter (Example 2 to 4) or star shaped extrusion conduits (Example 5).

The expanding ropes were cut at the exit face of the die into ball- or star-shaped pellets with a cutting device which was a standard CLEXTRAL pelletizer.

The different processing parameters are presented in table 1 below in which the abbreviations used correspond to those defined in Example 1:

TABLE 1

|  | Example No | | | |
| --- | --- | --- | --- | --- |
|  | 2 | 3 | 4 | 5 |
| water flow rate (kg/h) | 18 | 18 | 37 | 90 |
| dry mix " (kg/h) | 83 | 230 | 150 | 350 |
| water content of mixture (%) | 27 | 17.5 | 28.5 | 28.5 |
| t-mixcook (s) | 30 | 20 | 35 | 30 |
| T-mixcook (°C.) | 132–142 | 139–148 | 124–134 | 120–140 |
| n-mixcook (rpm) | 200 | 286 | 315 | 330 |
| W-mixcook (kW) | 11.6 | 30 | 24 | 33 |
| p-gear (kPa) | 100 | 100 | 200 | 150 |
| n-gear (rpm) | 12 | 21.5 | 20.5 | 20 |
| W-gear (kW) | 0.8 | 1.4 | 1.3 | 1.2 |
| E-mixture (kWh/kg) | 0.123 | 0.127 | 0.135 | 0.078 |
| p-die (kPa) | 4400 | 11400 | 8000 | 10500 |
| die conduits (mm) | 1 × 3.5 | 3 × 4 | 3 × 4 | 3 × 4 |

The cooked cereals manufactured in Examples 2 and 4 were ball-shaped semi-expanded pellets, ready to be processed with further down-stream equipment in order to be either puffed or rolled into flakes, for example.

The cooked cereals manufactured in Example 3 were ball-shaped expanded pellets, ready to be processed with further down-stream equipment in order to be toasted, for example.

The shape of the pellets manufactured in Examples 2 to 4 were similar to, and their smell, taste and texture were also similar to but could even be said to have improved as compared to those of corresponding pellets manufactured without the support of the gear pump.

The dry pet food manufactured in Example 5 were star shaped expanded pellets, ready to be processed with further down-stream equipment in order to be dried and coated, for example.

EXAMPLE 6 AND COMPARATIVE EXAMPLE

Energy measurements were taken for the mixing and cooking device of Example 3 when used to process the premix composition of Example 3. Results are shown below in Table 2.

TABLE 2

|  | Example No. 6 | comparative (without gear pump) |
| --- | --- | --- |
| water flow rate (kg/h) | 11.5 | 11.0 |
| dry mix flow rate (kg/h) | 235 | 230 |
| water content of mixture (%) | 15.2 | 15.1 |
| t-mixcook (s) | 20 | 20 |
| T-mixcook (°C.) | 134 | 160 |
| n-mixcook (rpm) | 300 | 300 |
| W-mixcook (kW) | 26.8 | 31.0 |
| p-gear (kPa) | 1800 | — |
| n-gear (rpm) | 24 | — |
| W-gear (kW) | 1.4 | — |
| E-mixture (kWh/kg) | 0.114 | 0.129 |
| p-die (kPa) | 15200 | 14500 |
| die conduits (mm) | 3 × 4 | 3 × 4 |

The results show that the energy input into the mixture, i.e., the value for E-mixture, is notably smaller for the gear pump assisted extrusion cooking compared to a traditional extrusion cooking process. The specific energy reduction for Example 6 is 11.6%.

Although comparative experiments were not conducted for the mixtures of Examples 2–5, the E-mixture value for those examples would be lower than for traditional extrusion processes. Thus, the process of the present invention reduces the energy input into the mixture by at least about 10% and preferably by 15 to 25% or more. These energy reductions translate to either a corresponding increase in the amount of material that can be processed, or a comparable reduction in size or energy usage of the equipment used to process the same amount of material.

As for the appearance and organoleptic properties of the cooked cereals of this example, it was found that both cooked cereals were provided in the form of ball-shaped expanded pellets which were ready to be processed with further equipment, such as to be coated with a sugar solution or flavoring component.

The shape, smell and taste of both cooked cereals were essentially the same. For the pellets of Example 6, however, the texture was noticeably different than the comparative example in that (1) the pores were more homogeneously distributed throughout the pellets, (2) a "crispy" mouth-feel was perceivable for a longer time and (3) the pellets retained their shape and crispiness for a longer time when consumed with milk. The pellets of Example 6 were preferred for these reasons.

We claim:

1. A process for the manufacture of cooked cereals or dry pet food, which comprises preparing a mixture of water and a dry premix comprising cereal flour or semolina, cooking the mixture to produce a gelatinized mixture having a degree of gelatinization of at least 95%, pressurizing the gelatinized mixture using a gear pump comprising two toothed wheels or rollers which mesh with each other with the teeth being configured and dimensioned to avoid friction therebetween as they mesh; and forcing the gelatinized cooked mixture through an extrusion die using pressure generated by the gear pump to subject the mixture to compression with a minimum shear force to thus reduce the energy input into the mixture by 10%–25%; wherein the organoleptic properties of the cereal are enhanced.

2. A process according to claim 1 in which the mixture is extrusion cooked, passed through the gear pump, and then further cooked by holding the mixture at a cooking temperature.

3. A process according to claim 1 in which the mixture of water and dry premix has a water content of about 10 to about 40% by weight.

4. A process according to claim 2 in which the mixture is cooked at a temperature of about 80 to about 200° C. for about 20 seconds to about 180 minutes.

5. A process according to claim 1 in which the pressure of the mixture prior to the gear pump is less than about 2000 kPa and the gear pump increases the pressure on the mixture to between about 2000 kPa and about 20000 kPa.

6. A process according to claim 5 in which the pressure of the mixture prior to the gear pump is from about 100 kPa to about 1000 kPa.

7. A process according to claim 1 in which the mixture is extrusion cooked.

* * * * *